United States Patent [19]
Gauthier et al.

[11] 4,282,410
[45] Aug. 4, 1981

[54] RINGING SIGNAL GENERATOR

[75] Inventors: John A. Gauthier; David M. Shaver, both of Brockville, Canada

[73] Assignee: GTE Automatic Electric Labs Inc., Northlake, Ill.

[21] Appl. No.: 28,622

[22] Filed: Apr. 9, 1979

[51] Int. Cl.³ .............................................. H04M 5/00
[52] U.S. Cl. .............................. 179/84 R; 179/51 AA
[58] Field of Search ............ 179/84 R, 84 SS, 15 BY, 179/17 E, 18 HB, 51 AA, 51 AB, 2 A; 328/14, 27; 307/261; 340/347 M, 347 AD, 334 DA; 331/60; 370/110

[56] References Cited
U.S. PATENT DOCUMENTS

| | | | |
|---|---|---|---|
| 3,581,020 | 5/1971 | Ribner | 179/84 R |
| 4,061,909 | 12/1977 | Bryant | 328/14 |

Primary Examiner—Joseph A. Popek
Attorney, Agent, or Firm—Robert J. Black; Gregory G. Hendricks

[57] ABSTRACT

A telephone ringing signal generator which sequentially produces a plurality of ringing signals each of a different frequency. Each of a plurality of tone ringers connected to the generator will ring only in response to it's particular frequency. A programmable oscillator generates the required frequencies under control of a time slot generator which defines the time slot during which each frequency is to be generated.

11 Claims, 2 Drawing Figures

TABLE A

| FREQUENCY (HZ) | FREQ. SEL KEY | TIME SLOT ENABLE KEY | FREQUENCY NO | TIME SLOT NO |
|---|---|---|---|---|
| 16<br>20 | K1-OFF<br>K1-ON | K7-ON | f1 | 1 |
| 25<br>30 | K2-OFF<br>K2-ON | K8-ON | f2 | 5 |
| 33<br>40<br>42 | K3-OFF, K4-OFF<br>K3-ON, K4-OFF<br>K3-ON, K4-ON | K9-ON | f3 | 4 |
| 50<br>54 | K5-OFF<br>K5-ON | K10-ON | f4 | 3 |
| 60<br>66 | K6-OFF<br>K6-ON | K11-ON | f5 | 2 |

RINGING SIGNAL GENERATOR

BACKGROUND OF THE INVENTION

1. Field of the Invention

The present invention relates to telephone system ringing generators and more particularly to a ringing signal generator capable of ringing a plurality of telephone substations each responsive to one of a plurality of different ringing signal frequencies.

2. Description of the Prior Art

Some telephone systems often include telephones which respond to different ringing frequencies. Therefore, in order to ring a selected telephone, the control system must apply a ringing signal of a frequency to which the particular telephone will respond.

Various methods have been employed to ring tuned ringers of different frequencies from one ringing supply. One approach is to use selective strapping arrangements to connect the ringing signal of the required frequency only to those telephones substations tuned to that particular frequency. A more modern approach is to use a data base that determines the ringing frequency necessary for each subscriber. This method involves storing the subscriber ringing frequency data, recalling it every time the subscriber's telephone is to be rung, and programming a programmable ringing generator. This data frequency must be changed when changes in the substation telephone are made. These prior art methods incur substantial penalties in the form of cost, size and/or limitations on performance.

Accordingly, it is an object of the present invention to provide a novel, low cost, reliable technique of ringing tuned ringers.

SUMMARY OF THE INVENTION

The present invention is designed to ring telephones employed in a door entry control system where the same telephones are connected to a telephone central office. In such entry systems a subscriber can converse with others via the telephone system or a potential visitor in the foyer and by dialing a code digit into the control system, unlock the entrance door.

The control system connects in series with the subscriber's central office line and is capable of ringing any telephone connected to it, no matter which frequency it is tuned for. To allow the subscriber to distinguish between a call from the central office and one from the door entry control system, the latter applies two short bursts of ringing followed by a pause.

The circuit consists of a time slot generator which includes a four bit counter connected between a clock circuit and a one-of-sixteen decoder. The decoder is connected to an oscillator enable circuit which controls a programmable oscillator. The decoder is also connected to a gate enable circuit which controls a ringing signal gating circuit. Gating circuit controls the time during which selected signals of different frequencies are gated from the programmable oscillator to a filter circuit which is connected thereto. An amplifier is connected between the filter circuit and a transformer which couples the resultant ringing signal to a plurality of telephone substations.

This circuit sequences a maximum of five different frequency signals on the line every 6.4 seconds. Each of the five signals is applied to the line for 1.2 seconds. Each 1.2 seconds cycle is further separated into a distinctive ring cycle of 0.4 seconds on, 0.4 seconds off and 0.4 seconds on. Therefore each substation responsive to particular frequency, will respond to a 1.2 second, two burst, ringing signal followed by 5.2 second dead period during which the remaining four ringing signals are sequenced on the line. The ringing frequency gating circuit includes switches which can be used to selectively disable any of the 1.2 second ringing cycles.

This circuit accommodates the following ringing schemes:

1. Decimonic—20, 30, 40, 50 and 60 Hz
2. Harmonic—16, 25, 33, 54 and 66 Hz
3. Synchromonic—42 Hz Since only five frequencies are sequenced on the line during each 6.4 seconds cycle, switches are included to control which signals will be sequenced on the line. The sequence of frequencies is designed to eliminate any spurious signals or bell tapping which may otherwise occur. During each 1.2 second period a programmable oscillator is caused to oscillate at a different frequency. Each signal of a different frequency is then gated through the frequency gating circuit which controls the 0.4 second periods during which enabled frequencies are gated to the filter circuit which shapes the enabled frequencies into sine waves. These frequencies are then amplified to ringing voltage levels for transmission to subscriber stations.

DESCRIPTION OF THE PREFERRED EMBODIMENT

Figure 1:
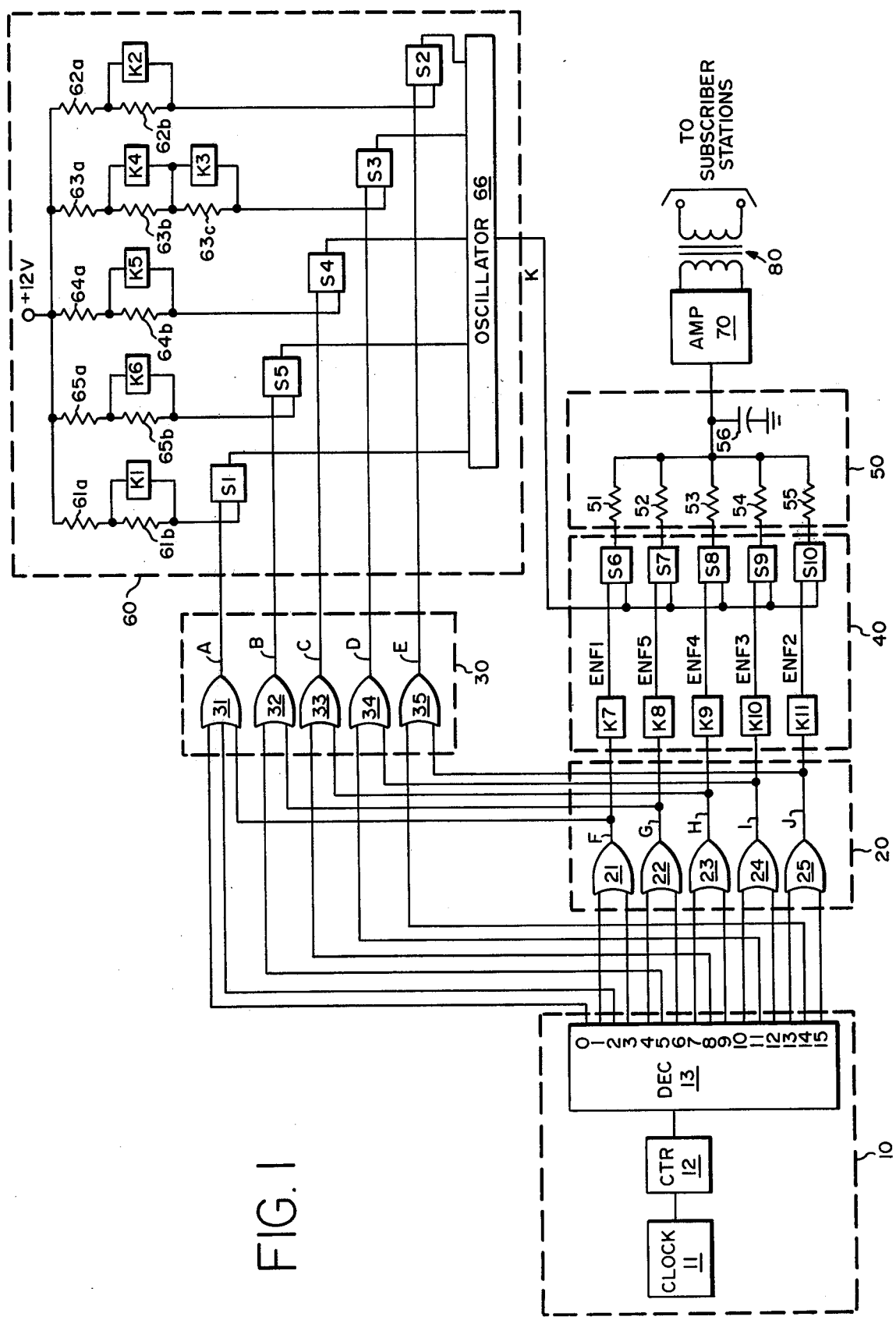
FIG. 1 is a schematic diagram of a ringing signal generator in accordance with the present invention.

Referring now to FIG. 1, the ringing signal generator of the present invention is shown. The clock circuit, counter, decoder, oscillator and amplifier comprise commercially available integrated circuits, which may be readily used to those skilled in the art to implement these elements.

The ringing signal generator of the present invention is operated to generate given sequences of ringing signals each of a different frequency every 6.4 seconds. Each frequency is on for 0.4 seconds, off four 0.4 seconds and on for 0.4 seconds, followed by a 5.2 second pause during which the other four frequencies are generated. Consequently, each tuned telephone substation responds during the presence of signals within its pass band to produce two short bursts of ringing tone followed by a pause.

The time slot generator 10 consists of a clock circuit 11 connected to a 4 bit counter 12 which is connected to a one-of-sixteen decoder 13. Decoder 13 is connected to oscillator enable circuit 30 and to gate enable circuit 20. Decoder 13 generates sixteen signals, 0 thru 15. Oscillator enable circuit 30 consists of five OR gates which generate oscillator enable signals on leads A, B, C, D and E which correspond to the following decoder signals:

0 or 1 or 2 or 3
B 4 or 5 or 6
C 7 or 8 or 9
D 10 or 11 or 12
E 13 or 14 or 15

Gate enable circuit 20 also consists of five OR gates which generate gate enable signals on leads F, G, H, I and J which correspond to the following decoder signals:

F 1 or 3
G 4 or 6
H 7 or 9
I 10 or 12
J 13 or 15

Programmable oscillator 60 includes oscillator 66 connected to bi-lateral switches S1, S2, S3, S4 and S5, which are connected to oscillator enable circuit 30 via leads A, B, C, D and E, respectively. Examples of these bi-lateral switches are quad analog switches, MC14016 series manufactured by Motorola. Switches S1 thru S5 are also connected to individual resistor networks 61 through 65. Key switches K1 thru K6 connected in parallel with these resistors provide the option of defining whether the decimonic, or harmonic ringing scheme will be used by shorting the associated resistor, per Table A. Synchromonic ringing 42 Hz can also be provided per Table A, by switching K3, K4 and K9 on and switching K7, K8, K10 and K11 off. Ringing frequency gating circuit 40 is connected to gate enable circuit 20 and oscillator 66. It includes Key switches K7, 8, 9, 10 and 11 connected to leads F, G, H, I and J, respectively, and these keys are also connected to bi-lateral switches S6, 7, 8 9 and 10, respectively. These bi-lateral switches are further connected via a common lead K to oscillator 66.

Filter circuit 50, connected to ringing frequency gating circuit 40, comprises resistors 51, 52, 53, 54 and 55 connected to bi-lateral switches S6, 7, 8, 9 and 10, respectively, and capacitor 56. The input of amplifier 70 is connected to the output of filter circuit 50 while its output is connected to transformer 80 which couples the ringing signal to the subscriber stations.

Operation of the ringing signal generation of the present invention is as follows: Initially, Keys K1-K6 are switched to the position required for decimonic, harmonic or synchromonic ringing in accordance with Table A. Also Keys K7 through K11 must be switched to the position required to enable or disable selected time slots in accordance with Table A.

For example, if it is desired to provide ringing signals on a decimonic basis (20, 30, 40, 50 and 60 Hz), Keys K1, K2 and K3 are placed in the "on" position and Keys K4, K5 and K6 are placed in the "off" position. Keys K7 thru K11 are all placed in the "on" position.

Clock circuit 10 generates a continuous pulsing pulsing signal having the 0.4 second period. The counter 12 responds to this signal by counting from 1 to 16, thus providing a 6.4 second (0.4 second×16) overall timing period. Decoder 13, decodes the output signals from counter 12 and sequentially generates 16 signals, 0 thru 15, which represent each 0.4 second increment of counter 12. Oscillator enable circuit 30 selectively gates groups of these decoder signals and generates signals on leads A, B, C, D and E which represent the decoded signals. These decoded signals enable bi-lateral switches S1, S5, S4, S3 and S2, respectively, such that resistor networks 61, 65, 64, 63 and 62, respectively, are sequentially connected to oscillator 66 when each switch is enabled. For example, during decoder counts of 7 or 8 or 9, bi-lateral switch S4 is enabled which connects resistor network 64 to oscillator 66 which generates a frequency of 50 or 54 Hz depending on whether Key K5 is "on" or "off". Similarly, gate enable circuit 20 selectively gates groups of decoder signals and generates signals on leads F, G, H, I and J which represent the decoded signals. These signals are transmitted to bi-lateral switches S6, 7, 8, 9 and 10 of ringing frequency gating circuit 40 depending on whether Keys K7, 8, 9, 10 or 11 are "on" or "off". Bi-lateral switches S6, 7, 8, 9 and 10 are also connected to oscillator 66 via lead K. During the time slots which enable signals are present on leads F, G, H, I and J, bi-lateral switches S6, 7, 8, 9 and 10 will gate the ringing frequency signal from oscillator 66 on lead K to filter 50. For example, during decoder counts of 7 and 9 bi-lateral switch S8 will gate the ringing frequency signal on lead K to filter 50 if key K9 is on.

Figure 2:
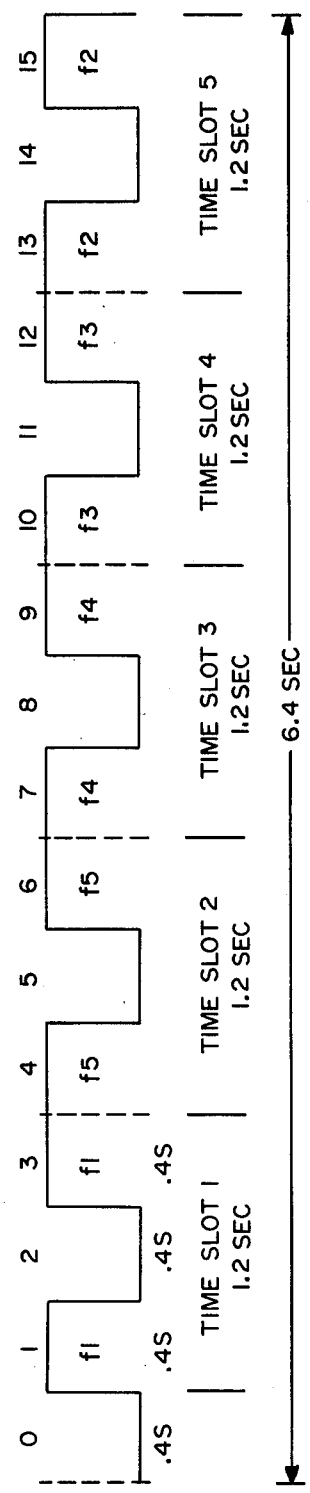
FIG. 2 is a timing diagram showing the overall ringing frequency timing employed in the ringing signal generator of the invention present.

Now, referring to FIG. 2 and Table A, frequency F4 which is 50 or 54 Hz and which is generated during decoder counts 7 or 8 or 9, will be transmitted to filter circuit 50 during decoder counts of 7 or 9 and will not be transmitted during count 8. This selective frequency generation and gating process occurs continuously as shown in FIG. 2.

Filter 50 now shapes the ringing frequency signal into a sine wave after which it is amplified by amplifier 70 and then stepped up to ringing voltage level (90 volts) by transformer 80, which also couples the ringing signal to the line.

The ringing signal generator of the present invention thus provides two short bursts of ringing signal followed by a pause, for each selected frequency, in order to distinguish it from a central office ringing signal. This generator provides for a maximum of five frequencies to be sequenced on the line during each ringing cycle with the option of using decimonic, harmonic or synchromonic ringing schemes. The order in which the frequencies are sequenced on the line was chosen such that each tuned ringer will only respond to its associated frequency without bell tapping or other unwanted signalling which would otherwise occur. It will be obvious to those skilled in the art that numerous modifications of the present invention can be made without departing from the spirit of the invention which shall be limited only by the scope of the claims appended hereto.

What is claimed is:

1. A ringing signal generator for use in a telephone communication system connectable to a plurality of telephone substations including at least a first substation responsive to a first ringing signal frequency and a second substation responsive to a second substation ringing signal frequency, said ringing signal generator comprising:

pulsing means operated to generate a plurality of periodic timing signals;
first gating means connected to said pulsing means operated in response to selected timing signals to generate a first plurality of enable signals; and
oscillation means;
a plurality of frequency determining means;
a plurality of first switching means connected between said oscillation means and said plurality of frequency determining means and also connected to said first gating means; said first plurality of switching means operated in response to each of said first plurality of enable signals to connect a predetermined one of said plurality of frequency determining means to said oscillation means; and
said oscillation means operated to generate a signal of a predetermined frequency in response to being connected to said one of said plurality of frequency determining means.

2. A ringing signal generator as claimed in claim 1, wherein: said pulsing means comprises a clock circuit operated to generate a plurality of periodic clock pulses; counting means connected to said clock circuit operated in response to said clock pulses to count said clock pulses and generate a plurality of counter output signals; and decoding means connected to said counting means operated in response to said plurality of counter output signals, to decode said plurality of counter output signals and generate said plurality of timing signals.

3. A ringing signal generator as claimed in claim 2, wherein: said first gating means comprise a first plurality of gate circuits connected to said decoding means operated in response to a first pre-determined group of said timing signals to generate a first plurality of enable signals.

4. A ringing signal generator as claimed in claim 3, wherein there is further included: filter means connected to said oscillation means operated to shape said plurality of signals of different frequencies into a sine wave.

5. A ringing signal generator as claimed in claim 4, wherein there is further included: amplification means connected to said filter means operated to amplify said sine wave.

6. A ringing signal generator as claimed in claim 5, wherein there is further included: transformer means connected to said amplification means operated in response to said amplified signals to increase the voltage of said signals and to couple the resultant ringing signals of different frequencies sequentially to said plurality of telephone substations.

7. A ringing signal generator as claimed in claim 4, wherein: said filter means comprise a filter circuit connected to second gating means; said second gating means further connected to said oscillation means and to said decoding means; said second gating means operated in response to a second pre-determined group of said timing signals to selectively gate said plurality of signals of different frequencies from said oscillation means to said filter circuit.

8. A ringing signal generator as claimed in claim 7, wherein; said second gating means comprise a second plurality of gates connected to said decoding means and a plurality of second switching means connected to said second plurality of gates to said filter circuit and to said oscillation means; said second plurality of gates operated in response to said second group of pre-determined timing signals to generate a second plurality of enable signals; and said second plurality of switching means operated in response to a pre-determined one of said second plurality of enable signals to connect a pre-determined one of said different frequency signals to said filter circuit.

9. A ringing signal generator as claimed in claim 8, wherein said second gating means further include: a plurality of connection means normally connected between said second plurality of gates and said second plurality of switching means, said connection means manually operated to prevent selected enable signals from enabling associated portions of said second switching means to prevent transmission of selected ringing signals of different frequencies from said oscillator means to said filter circuit.

10. A ringing signal generator as claimed in claim 8, wherein: said first and said second plurality of switching means comprise a first and second plurality of bi-lateral analog semi-conductor switches.

11. A ringing signal generator as claimed in claim 1, wherein there is further included: frequency selection means associated with each of said frequency determining means; said frequency selection means manually operated to select one of a plurality of frequencies determinable by said frequency determining means.

* * * * *

UNITED STATES PATENT AND TRADEMARK OFFICE
CERTIFICATE OF CORRECTION

PATENT NO. : 4,282,410
DATED : August 4, 1981
INVENTOR(S) : John A. Gauthier & David M. Shaver It is certified that error appears in the above-identified patent and that said Letters Patent are hereby corrected as shown below:

Column 5, line 4, change "comprises" to --comprise--
Column 6, line 27, change "oscillator" to --oscillation--

Signed and Sealed this

Seventeenth Day of November 1981

[SEAL]

Attest:

GERALD J. MOSSINGHOFF

Attesting Officer

Commissioner of Patents and Trademarks